United States Patent
Auer et al.

(10) Patent No.: US 9,887,655 B2
(45) Date of Patent: Feb. 6, 2018

(54) EXCITATION CURRENT-LIMITED POWER GENERATOR

(71) Applicants: Infineon Technologies AG, Neubiberg (DE); VALEO EQUIPEMENTS ELECTRIQUES MOTEUR, Creteil (FR)

(72) Inventors: Frank Auer, Roehrmoos (DE); Christoph Seidl, Graz (AT); Robert Hartmann, Munich (DE); Ludovic Doffe, Beaurainville (FR); Cédric Agneray, Estréelles (FR)

(73) Assignees: INFINEON TECHNOLOGIES AG, Neubiberg (DE); VALEO EQUIPEMENTS ELECTRIQUES MOTEUR, Creteil (FR)

( * ) Notice: Subject to any disclaimer, the term of this patent is extended or adjusted under 35 U.S.C. 154(b) by 17 days.

(21) Appl. No.: 15/168,451

(22) Filed: May 31, 2016

(65) Prior Publication Data

US 2017/0346431 A1 Nov. 30, 2017

(51) Int. Cl.
| H02P 11/00 | (2006.01) |
| H02H 7/06 | (2006.01) |
| H02P 9/00 | (2006.01) |
| H02P 9/10 | (2006.01) |
| H02P 9/04 | (2006.01) |
| F02N 11/06 | (2006.01) |

(52) U.S. Cl.
CPC ............... H02P 9/10 (2013.01); H02P 9/006 (2013.01)

(58) Field of Classification Search
USPC ............ 322/15, 29; 290/40 R; 700/287
See application file for complete search history.

(56) References Cited

U.S. PATENT DOCUMENTS

| 3,866,108 A * | 2/1975 | Yannone | F02C 9/40 |
| | | | 290/40 R |
| 3,866,109 A * | 2/1975 | Reed | F02C 3/04 |
| | | | 290/40 R |
| 3,875,380 A * | 4/1975 | Rankin | F02C 9/40 |
| | | | 60/39.281 |
| 3,891,915 A * | 6/1975 | Yannone | F02C 7/26 |
| | | | 290/2 |
| 3,898,439 A * | 8/1975 | Reed | F02C 9/26 |
| | | | 700/287 |
| 3,919,623 A * | 11/1975 | Reuther | F02C 9/26 |
| | | | 290/4 R |
| 3,924,140 A * | 12/1975 | Yannone | H02P 9/04 |
| | | | 290/40 C |
| 4,031,407 A * | 6/1977 | Reed | H02J 3/42 |
| | | | 290/1 R |

(Continued)

*Primary Examiner* — Pedro J Cuevas
(74) *Attorney, Agent, or Firm* — Slater Matsil, LLP

(57) ABSTRACT

An excitation current-limited power generator includes a digital interface configured to be coupled to an engine control unit (ECU), a regulator coupled configured to be coupled to an excitation current input of an alternator, the excitation current controlling current generated by the alternator, a frequency sensor configured to measuring rotation speed of the alternator, and memory storing a communicated limit received by the digital interface and a first permanent limit, the regulator configured to limit the excitation current to the lesser of the first permanent limit and the communicated limit.

20 Claims, 8 Drawing Sheets

(56) References Cited

U.S. PATENT DOCUMENTS

| | | | | |
|---|---|---|---|---|
| 4,039,804 A * | 8/1977 | Reed | .......................... | F02C 9/32 |
| | | | | 60/646 |
| 4,259,835 A * | 4/1981 | Reed | .......................... | F02C 9/28 |
| | | | | 60/39.281 |
| 4,283,634 A * | 8/1981 | Yannone | ................... | F02C 9/26 |
| | | | | 290/40 R |
| 4,308,463 A * | 12/1981 | Giras | ........................ | H02J 3/42 |
| | | | | 290/40 R |
| 4,380,146 A * | 4/1983 | Yannone | ................... | F02C 9/00 |
| | | | | 60/39.281 |
| 4,482,813 A * | 11/1984 | Grand-Perret | .......... | B60L 11/02 |
| | | | | 290/14 |
| 4,536,126 A * | 8/1985 | Reuther | ................... | H02J 3/42 |
| | | | | 290/40 R |
| 4,994,684 A * | 2/1991 | Lauw | ....................... | H02P 9/42 |
| | | | | 290/40 C |
| 7,646,178 B1 * | 1/2010 | Fradella | ............... | H02K 1/2793 |
| | | | | 322/22 |
| 7,743,616 B2 * | 6/2010 | Renken | ................ | B60H 1/3222 |
| | | | | 62/129 |
| 2008/0087029 A1 * | 4/2008 | Renken | ................ | B60H 1/3222 |
| | | | | 62/134 |
| 2009/0326724 A1 * | 12/2009 | Lasseter | ................. | H02J 9/062 |
| | | | | 700/287 |

* cited by examiner

EXCITATION CURRENT-LIMITED POWER GENERATOR

TECHNICAL FIELD

The present invention relates generally to power generation, and in particular embodiments, to techniques and mechanisms for an excitation current-limited power generator.

BACKGROUND

Power generators typically include a rotating coil in stator coils. The output current of stator coils may be controlled by changing an excitation current flowing through the rotating coil. Some types of power generators, such as alternators, are typically used in applications that include combustion engines, e.g., passenger automobiles, such that the power generator may be connected to the powertrain of the combustion engine.

Power generators can experience degraded performance under harsh environmental conditions, e.g., cold temperatures and lower rotation speeds. Quick speed cycles of an engine, e.g., accelerating and decelerating, may result in a combustion engine periodically operating at lower engine speeds. Further, research efforts for passenger automobiles have increasingly focused on lowering engine speeds in an effort to improve fuel efficiency. Problems associated with operating power generators at lower engine speeds have thus been exacerbated. The performance of power generators in modern fuel-efficient automobiles may be further worsened in colder climates.

Worsened performance of a power generator may result in the generator exceeding the maximum rated output of the generator, or may cause the generator to experience counter-torque from the combustion engine. Such degraded performance can damage the power generator over time.

SUMMARY OF THE INVENTION

Technical advantages are generally achieved by embodiments of this disclosure, which describe techniques and mechanisms for an excitation current-limited power generator.

In accordance with some embodiments, a device is provided. The device includes a digital interface configured to be coupled to an engine control unit (ECU), a regulator coupled configured to be coupled to an excitation current input of an alternator, the excitation current controlling current generated by the alternator, a frequency sensor configured to measuring rotation speed of the alternator, and memory storing a communicated limit received by the digital interface and a first permanent limit, the regulator configured to limit the excitation current to the lesser of the first permanent limit and the communicated limit.

In some embodiments, the regulator is further configured to periodically update the first communicated limit with a value received from the ECU. In some embodiments, the value received from the ECU is selected to limit the current generated by the alternator. In some embodiments, the value received from the ECU is selected to limit counter-torque induced in the alternator. In some embodiments, the memory further stores a second permanent limit, and a rotation threshold associated with the second permanent limit, wherein the regulator is further configured to limit the excitation current to the lesser of the second permanent limit and the communicated limit when the rotation speed of the alternator is greater than the rotation threshold. In some embodiments, the first permanent limit is greater than the second permanent limit. In some embodiments, the first permanent limit is less than the second permanent limit. In some embodiments, the regulator is further configured to limit the excitation current to the first permanent limit in response to the digital interface losing connection with the ECU. In some embodiments, the device further includes the alternator. In some embodiments, the alternator comprises a rotating coil in stator coils.

In accordance with some embodiments, a method is provided. The method includes receiving a communicated limit for excitation current in an alternator over a digital interface, determining a permanent limit for the excitation current in the alternator, limiting the excitation current to the communicated limit in response to the communicated limit being less than the permanent limit, and limiting the excitation current to the permanent limit in response to the communicated limit being greater than the permanent limit.

In some embodiments, determining the permanent limit comprises determining a rotation speed of the alternator, and selecting a permanent limit from one or more permanent limits, the one or more permanent limits each corresponding to a lower and upper rotation speed threshold, the rotation speed of the alternator being between the lower and upper rotation speed threshold of the selected permanent limit. In some embodiments, the one or more permanent limits comprise a first permanent limit and a second permanent limit, the upper rotation speed threshold of the first permanent limit being less than the upper rotation speed threshold of the second permanent limit. In some embodiments, the first permanent limit is greater than the second permanent limit. In some embodiments, the first permanent limit is less than the second permanent limit. In some embodiments, the method further includes receiving an updated permanent limit over the digital interface, and storing the updated permanent limit in memory.

In accordance with some embodiments, a system is provided. The system includes an engine control unit (ECU), a digital interface coupled to the engine control unit, an alternator coupled to the digital interface, the alternator comprising memory configured to store a communicated limit received from the digital interface and a first permanent limit, an excitation current input, and a regulator coupled to the excitation current input, the regulator configured to control current output from the alternator by varying the excitation current, the regulator configured to limit the excitation current to the lesser of the first permanent limit and the communicated limit.

In some embodiments, the alternator further comprises a rotation sensor coupled to an output of the alternator, the rotation sensor measuring rotation speed of the alternator. In some embodiments, the memory is further configured to store a second permanent limit, the first permanent limit associated with a first rotation threshold and the second permanent limit associated with a second rotation threshold, the alternator configured to limit the excitation current to the first permanent limit when the rotation speed of the alternator is less than the first rotation threshold, the alternator configured to limit the excitation current to the second permanent limit when the rotation speed of the alternator is less than the second rotation threshold. In some embodiments, the alternator is configured to update the first permanent limit stored in the memory with an updated permanent limit received from the ECU over the digital interface.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein are techniques and mechanisms for an excitation current-limited power generator. Various embodiments include self-protection mechanisms in a power generator limiting the excitation current applied to the rotating coil of the power generator. The excitation current may be limited based on a measured rotation speed of the power generator. Excitation current limitation thresholds may be selected to limit maximum current output, measured in amperes (A), and/or counter-torque, measured in newton-meters (N-m). Various self-protection mechanisms may be applied independently of an engine control unit (ECU), which may also monitor and control the excitation current or power supply voltage level of the rotating coil.

Various embodiments may achieve advantages. Limiting current output of the power generator may allow the generator to operate in harsher environmental conditions, such as cold climates, without exceeding maximum output of the generator. Ensuring the generator does not exceed maximum output may avoid damaging the generator or devices powered by the generator, such as passenger vehicle loads. Limiting torque production of the power generator may allow the generator to operate at lower speeds, such as low engine speed of a passenger automobile, without damaging the generator or producing undesirable side effects, such as humming, in the engine of the automobile. Efficiency, reliability, comfort, and lifespan of fuel-efficient vehicles may thus be improved.

Figure 1:
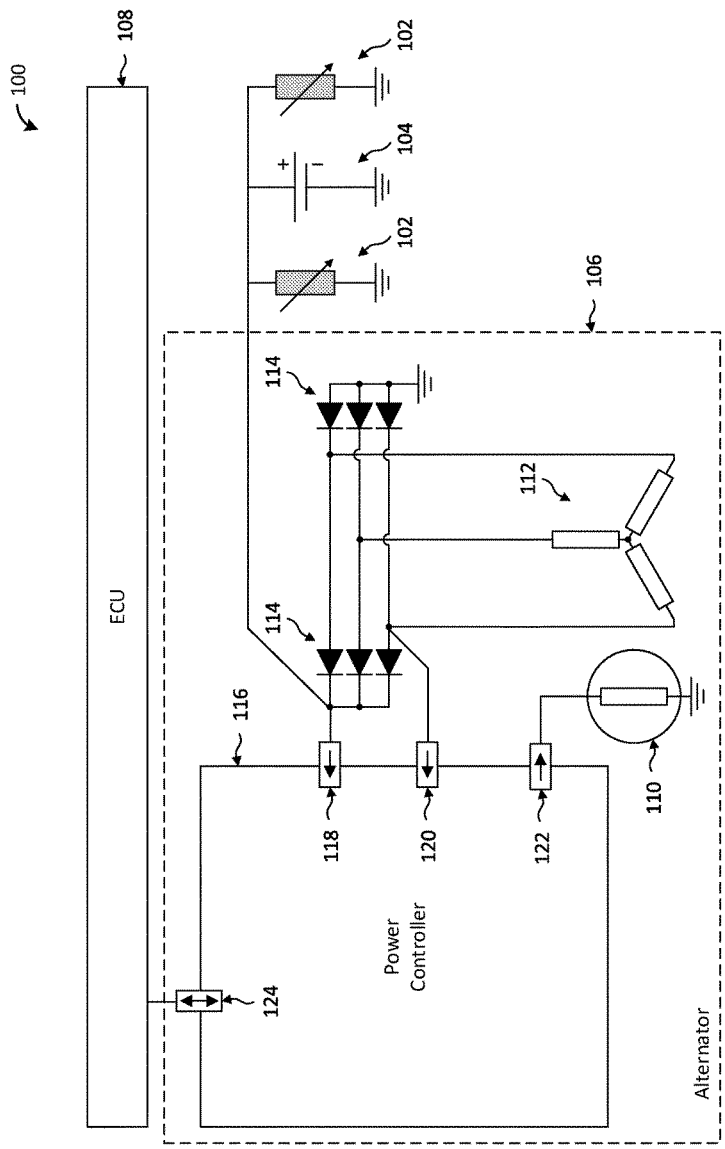
FIG. 1 illustrates an automotive system.

FIG. 1 illustrates an automotive system 100 that may be used in an automobile or other passenger vehicle such as a car or truck. The automotive system 100 includes vehicle loads 102, a battery 104, an alternator 106, and an ECU 108. While the present discussion is presented in the context of passenger automobiles, it should be appreciated that embodiments described herein may be applied to any power generator with moving magnets.

The vehicle loads 102 include devices necessary to operate the automotive system 100. Examples of vehicle loads 102 may include the ignition, spark plugs, climate control, and entertainment systems in the automotive system 100. The battery 104 provides an initial charge to the vehicle loads 102 during ignition of the automotive system 100. The battery 104 may, for example, be a 12 volt battery. Additionally, the battery 104 acts as an electrical buffer for the output of the alternator 106.

The alternator 106 includes a rotating coil 110, stator coils 112, rectifier diodes 114, and a power controller 116. The rotating coil 110 is located inside the stator coils 112, and includes a rotating magnetic field (not illustrated). Rotating the magnetic field created by the rotating coil 110 in the stator coils 112 generates electrical current in outputs of the stator coils 112. There may be three of the stator coils 112, such that the generated power is three-phase alternating current (AC) power. The rectifier diodes 114 rectify the generated three-phase AC power to produce direct current (DC) power. The DC power is delivered to power the vehicle loads 102 and charge the battery 104.

The power controller 116 includes a voltage level input 118, a rotation speed input 120, an excitation current output 122, and a digital input/output (I/O) 124. The power controller 116 is coupled to various components of the alternator 106 so that it may control the amount of current generated by the alternator 106. Control of the current output may be achieved by varying the excitation current of the rotating coil 110. The power controller 116 may be, e.g., an application-specific integrated circuit (ASIC) or a state machine.

The voltage level input 118 is coupled to the rectifier diodes 114 so that the power controller 116 may measure DC power output by the alternator 106. The voltage level input 118 may allow the power controller 116 to determine whether the output of the alternator 106 has been exceeded. Such a protection mechanism may allow the power controller 116 to reduce production by reducing the excitation current of the rotating coil 110.

The rotation speed input 120 is coupled to one of the stator coils 112. As discussed above, there may be multiple stator coils 112, such that the stator coils 112 generate three-phase AC power. Coupling the rotation speed input 120 to one of the stator coils 112 allows the power controller 116 to measure the frequency of one of the three-phase AC outputs. The frequency output from each of the stator coils 112 corresponds to the rotation speed of the alternator 106. Accordingly, by measuring the frequency of one of the signals from the stator coils 112, the power controller 116 may determine the rotation speed (in RPM) of the alternator 106.

The excitation current output 122 is coupled to the rotating coil 110. As discussed above, the output current of the alternator 106 may controlled by varying the excitation current of the rotating coil 110. Accordingly, the power controller 116 may control the output current of the alternator 106 through the excitation current output 122. The power controller 116 may limit the excitation current of the rotating coil 110 in response to communication from the ECU 108 (discussed below) or in response to a self-protection feature (also discussed below).

The digital I/O 124 allows the alternator 106 to communicate with other devices in the automotive system 100, such as the ECU 108. The digital I/O 124 may be capable of bi-directional digital communication. Examples of such a communication system may include a local interconnect network (LIN). Communication over the digital I/O 124 may be performed in time-fixed schedule slots, such as every 100 milliseconds (ms). The digital I/O 124 may be shared with other devices in the automotive system 100, such that the power controller 116 may only communicate with the ECU 108 during a portion of the schedule slots. Accordingly, communication with the ECU 108 may have a low throughput and a high latency.

The ECU 108 is coupled to the alternator 106 and other devices (not pictured) in the automotive system 100 so that it may control and monitor parameters of the devices. The ECU 108 communicates with the alternator 106 through the digital I/O 124. Because the ECU 108 is capable of measuring many parameters in the automotive system 100, the ECU 108 may have access to more information than the power controller 116, and in some situations may be able to more accurately control output current or counter-torque produced by the alternator 106. In some embodiments, the ECU 108 may control production of the alternator 106 by communicating an excitation current limit to the power controller 116.

In order to control the output of the alternator 106, the ECU 108 should be capable of supporting such functionality. As discussed above, the digital I/O 124 between the alternator 106 and the ECU 108 may be slow, such that the ECU may not be capable of responding to sudden changes conditions such as speed. Accordingly, brief peaks of current output and/or counter-torque may occur in the alternator 106 before the ECU 108 communicates a new excitation current limit to the power controller 116. Further, the digital I/O 124 may fail, resulting in a temporary or permanent loss of communication with the alternator 106. During these periods of lost communication, damage may occur to the alternator 106. Over its lifetime, these brief peaks of current and/or counter-torque may wear on the alternator 106, reducing its lifecycle. Further, such peaks may also harm the on-board power supply network of the automotive system 100, such as the vehicle loads 102 and/or the battery 104.

Figure 2A:
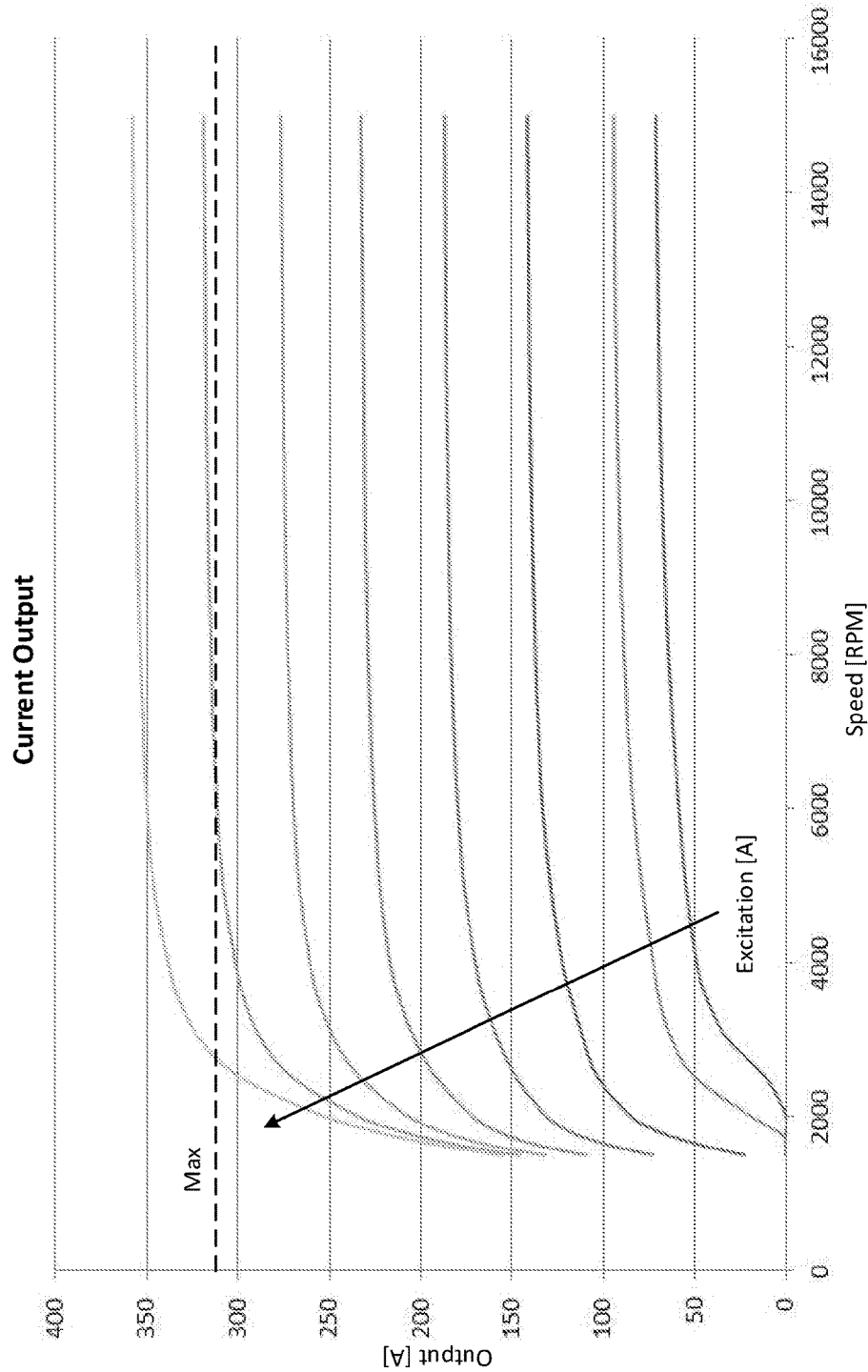
FIGS. 2A and 2B illustrate example current and torque output curves.
Figure 2B:
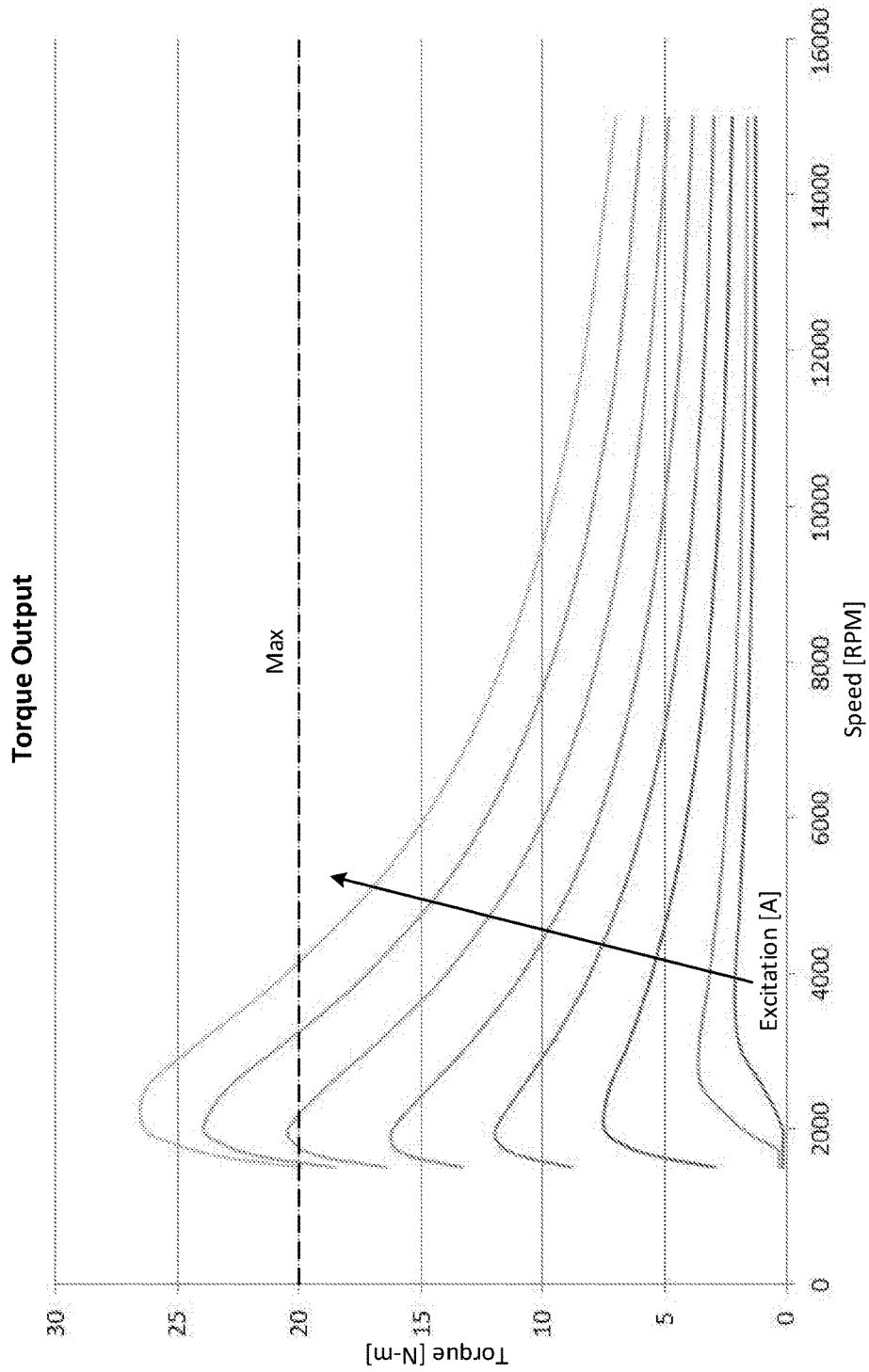

FIGS. 2A and 2B illustrate example current and torque output curves, respectively, for an alternator at different excitation currents. As can be seen in FIG. 2A, the maximum rated current output of the alternator is about 315 [A], as illustrated by the dashed line in FIG. 2A. Each of the output current curves of the alternator increases with RPM and eventually converges on a final output current. For example, at the lowest excitation current, the output current gradually increases until it is outputting about 75 [A] at about 8000 RPM. Conversely, at the highest excitation current, the output current sharply increases until it is outputting about 350 [A] at about 8000 RPM. In some embodiments, the alternator may operate at a higher excitation current when driven at a lower RPM in order to quickly achieve sufficient current output. In some embodiments, the alternator may operate at a lower excitation current when driven at a higher RPM in order to avoid excessive current output.

As can be seen in FIG. 2B, the maximum rated torque output of the alternator is about 20 [N-m], as illustrated by the dashed line in FIG. 2B. Each of the output torque curves of the alternator has a peak at lower RPM, the amplitude of which is proportional to the excitation current. For example, at the lowest excitation current, the output torque peaks at about 2 [N-m] at about 3000 RPM. Conversely, at the highest excitation current, the output torque peaks at about 27 [N-m] at about 3000 RPM. In some embodiments, the alternator may operate at a lower excitation current when driven at a lower RPM in order to avoid torque peaks that may damage the alternator. In some embodiments, the alternator may operate at a higher excitation current when driven at a higher RPM, as there is a decreased risk of torque peaks at a higher RPM.

FIGS. 2A and 2B illustrate a trade-off between current and torque peaks, which may occur at higher excitation currents, and achieving sufficient current output, which is difficult to achieve at lower excitation currents. These peaks may occur over a relatively short time periods, such that the ECU 108 may not respond to the peaks in a timely manner. Accordingly, in some embodiments, the power controller 116 may perform self-protection of the alternator 106 independent of the ECU 108 to avoid current and/or torque peaks that may cause damage.

Figure 3:
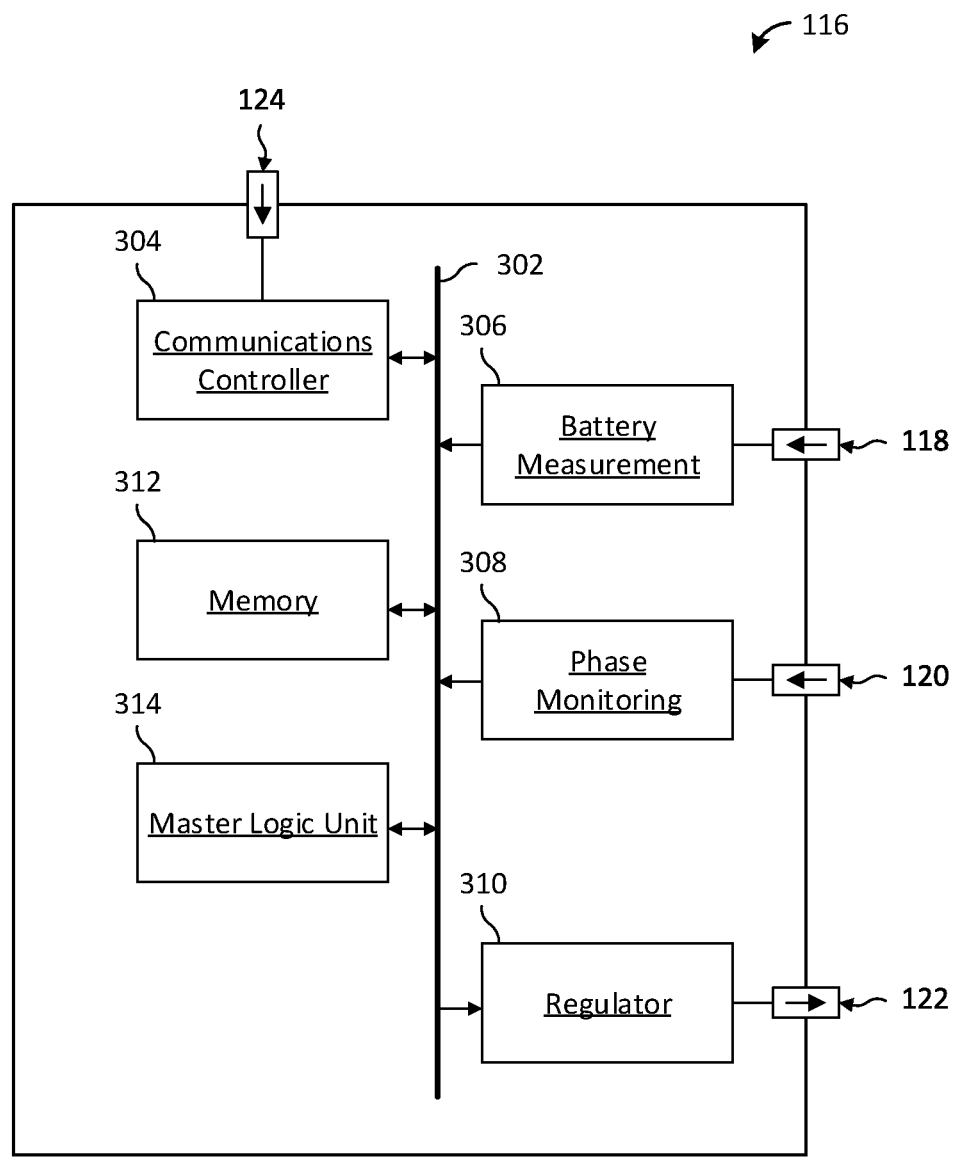
FIG. 3 illustrates a detailed view of a power controller.

FIG. 3 illustrates a detailed view of the power controller 116. The power controller 116 includes a bus 302, a communications controller 304, a battery sensor 306, a frequency sensor 308, a regulator 310, memory 312, and a master logic unit 314. Devices in the power controller 116 may or may not be connected to the bus 302.

While they are shown as functional blocks, it should be appreciated that the battery sensor 306, the frequency sensor 308, and the regulator 310 may include other components to interface the power controller 116 with components in the alternator 106. For example, these devices may include transducers, analog-to-digital converters, digital-to-analog converters, registers, amplification circuitry, supporting circuitry, and the like.

The communications controller 304 is coupled to the digital I/O 124, and interfaces the alternator 106 with external devices, such as the ECU 108. As discussed above, the digital I/O 124 may be a bi-directional digital interface, such as LIN. As such, the communications controller 304 may be, e.g., a LIN controller.

The battery sensor 306 is coupled to the voltage level input 118, such that the power controller 116 may measure the output voltage level of the battery 104 and the DC power output from the alternator 106. The battery sensor 306 may, for example, be an analog-to-digital converter. In some embodiments, the analog-to-digital converter may be a 10-bit ADC.

The frequency sensor 308 is coupled to the rotation speed input 120, such that the power controller 116 may measure the frequency of the output AC signal from one of the stator coils 112. The frequency sensor 308 may, for example, comprise a linear oscillator, such as a resistor-capacitor oscillator, which is used to detect the frequency of the AC waves. The rotation speed of the alternator 106 may thus be determined according to the measured frequency and the quantity of phases rectified by the rectifier diodes 114. By relating frequency of the AC signal to engine rotation speed, the power controller 116 can determine rotation speed of the alternator 106, independently of any engine speed parameters that may be communicated via the communications controller 304.

The regulator 310 is coupled to the excitation current output 122, such that the power controller 116 may vary the excitation current of the rotating coil 110. By varying the excitation current, the regulator 310 may thus regulate and control and output current of the alternator 106. The regulator 310 may, for example, be a voltage regulator.

The memory 312 may be volatile memory, such as random access memory (RAM), or non-volatile memory (NVRAM), such as EEPROM. In some embodiments, the memory 312 includes both RAM and NVRAM. The NVRAM may be implemented using fuses, electronic fuses (e-fuses), or one-time programmable (OTP) memory. The memory 312 is used to store limitation parameters (sometimes referred to as "limits"). Limits are maximum excitation current values that the regulator 310 should observe when varying the excitation current supplied to the rotating coil 110. One or more limits may be included with the memory 312, and the limit applied may be determined according to different states of the alternator 106.

In some embodiments, a first type of current limit (sometimes referred to as a "communicated limit") may be communicated to the power controller 116 over the communications controller 304 and stored in the memory 312. A communicated limit may be considered immediately when determining the current supplied to the rotating coil 110. A communicated limit may be stored in RAM or NVRAM portions of the memory 312.

In some embodiments, a second type of current limit (sometimes referred to as a "permanent limit") may be considered when determining the current supplied to the rotating coil 110. The permanent limit is stored in NVRAM portions of the memory 312, such that it may be persisted in the power controller 116 after a loss of power or a loss of communication with the ECU 108. Accordingly, the power controller 116 may be capable of reading the permanent limit from NVRAM and limiting excitation current to the permanent limit during periods of lost or missing communication. For example, excitation current may be limited during vehicle ignition, before the ECU 108 has sent a communicated limit to the power controller 116. A permanent limit may be pre-programmed in the NVRAM. In some embodiments, a permanent limit may be communicated to the power controller 116 over the communications controller 304 from time to time, and the permanent limit may be stored in NVRAM. It should be appreciated that multiple permanent limits and/or communicated limits may be stored in the memory 312.

In some embodiments, each of the permanent limits stored in the memory 312 may be associated with an engine rotation speed threshold, measured in RPM. The regulator 310 may select different permanent limits to apply to the excitation current according to the rotation speed determined by the frequency sensor 308. For example, a first permanent limit may be associated with a first rotation speed threshold, and a second permanent limit may be associated with a second rotation speed threshold higher than the first rotation speed threshold. The regulator 310 may apply the first permanent limit when the measured rotation speed is less than the first rotation speed threshold, and then may apply the second permanent limit when the measured rotation speed is less than the second rotation speed threshold. A hysteresis may be included with each different rotation speed threshold applied.

In some embodiments, the regulator 310 may consider both a permanent limit and a communicated limit when limiting excitation current. The regulator 310 may prefer the lower of the permanent limit and the communicated limit, such that the permanent limit is not exceeded. In other words, if the communicated limit is lower than a permanent limit that is currently applied, then the regulator 310 may permit the excitation current to be lowered to the communicated limit. However, if the communicated limit is greater than the permanent limit, then the regulator 310 may not permit the excitation current to be increased past the permanent limit. The ECU 108 may thus apply a lower communicated limit, which may allow the ECU 108 to perform torque management for the alternator 106. However, the ECU 108 may not override the alternator 106 with a higher permanent limit. Such a protection mechanism may protect the alternator 106 and allow faster protection reaction times when output current is quickly increased. In some embodiments, the output of the alternator 106 may be switched on or off if the voltage level measured by the battery sensor 306 is less than the limit that the regulator 310 is applying.

The master logic unit 314 is the main processing pipeline for the power controller 116. It includes function units and/or circuitry for performing start-up sequences, controlling the regulator 310 and the communications controller 304, and optimizing, testing, and debugging the power controller 116. The master logic unit 314 may also include functionality for interacting with the battery sensor 306 and the frequency sensor 308. The master logic unit 314 may select a permanent limit from the memory 312 based on the measured speed, and may determine whether to apply the permanent or communicated limit to the regulator 310.

Figure 4:
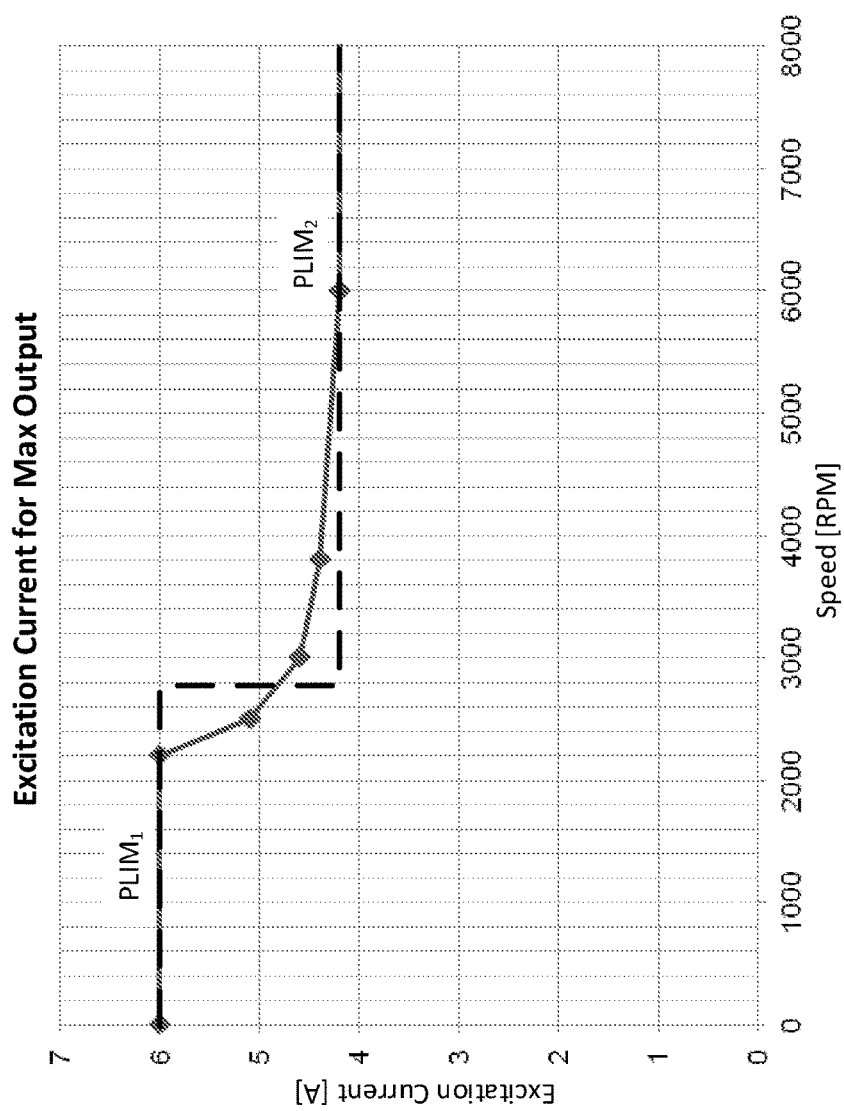
FIG. 4 illustrates excitation current curves.

FIG. 4 illustrates the excitation current necessary to achieve an ideal output current for an alternator at various engine speeds. An ideal output current may be an output current that approaches the peak output current. As illustrated by the solid line, at lower speeds the alternator will not exceed peak output current even at maximum excitation current, as lower engine speeds may not generate enough power to exceed the peak output. However, as engine speed increases, the permanent limit for the excitation current is lowered in order to prevent the alternator from exceeding peak output.

In some embodiments, the memory may include a permanent limit for the engine speed corresponding to each data point forming the solid line. The power controller may thus include sufficient permanent limits for the excitation current so that the alternator does not exceed peak output current at any engine speed. For example, assuming an alternator has output characteristics similar to the response illustrated in FIG. 4, the alternator memory would include six permanent limits (ranging from about 6 [A] to about 4 [A]) at respective rotation speed threshold (ranging from about 0 RPM to about 6500 RPM) to ensure the alternator does not exceed peak current output.

In some embodiments, the memory may include a relatively fewer quantity of permanent limits. As such, the power controller may limit the excitation current so that the alternator does not exceed peak output current at most engine speeds. For example, the dashed line in FIG. 4 illustrates an embodiment where only two permanent limits ($PLIM_1$ and $PLIM_2$) are included in the memory. As a result, when only two permanent limits are used, the alternator may exceed or fall below peak current output for some engine speeds (a small band between approximately 2500 RPM and 3500 RPM), but will generally operate at or near an ideal output. More or less permanent limits could be used, such that the alternator's response characteristics are a closer or further approximation of the ideal output.

Figure 5:
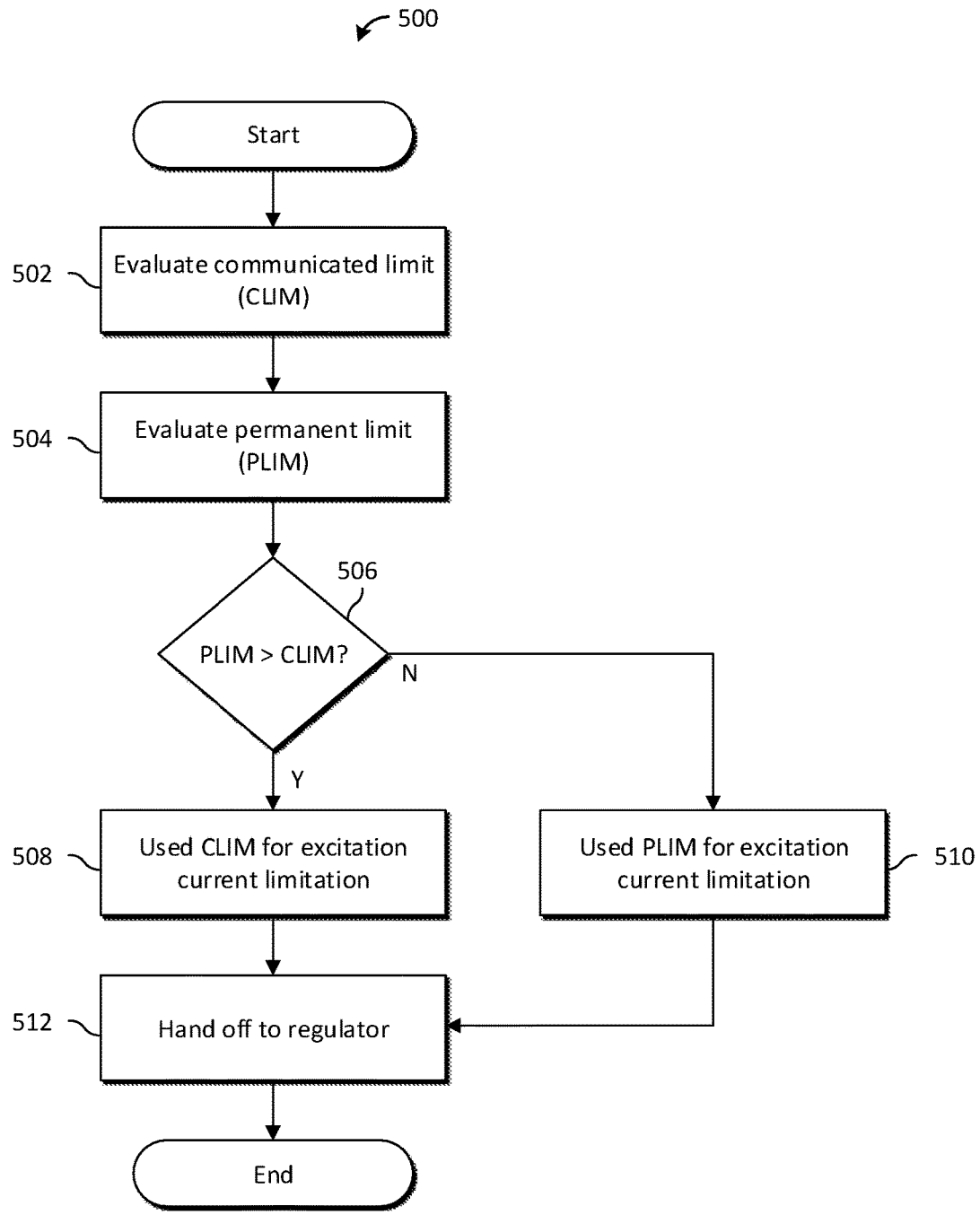
FIG. 5 illustrates an alternator over-current protection method.

FIG. 5 illustrates an alternator over-current protection method 500. The alternator over-current protection method 500 may be indicative of operations occurring in the power controller 116 when applying a permanent or communicated limit to the excitation current produced by the regulator 310.

The alternator over-current protection method 500 begins by evaluating a communicated limit (step 502). The communicated limit may be received from an ECU. The communicated limit may be periodically updated by the ECU. Next, a permanent limit is evaluated (step 504). Evaluation of the permanent limit may include selecting a permanent limit according to a measured rotation speed of the alternator. Next, if the permanent limit exceeds the communicated limit (step 506), the permanent limit is used to limit excitation current (step 508). However, if the permanent limit does not exceed the communicated limit (step 506), the communicated limit is used to limit excitation current (step 510). Once either the permanent or communicated limit is chosen, the value is then passed to the regulator (step 512). The regulator may then choose an excitation current for the rotating coils that does not exceed the chosen limit.

Figure 6:
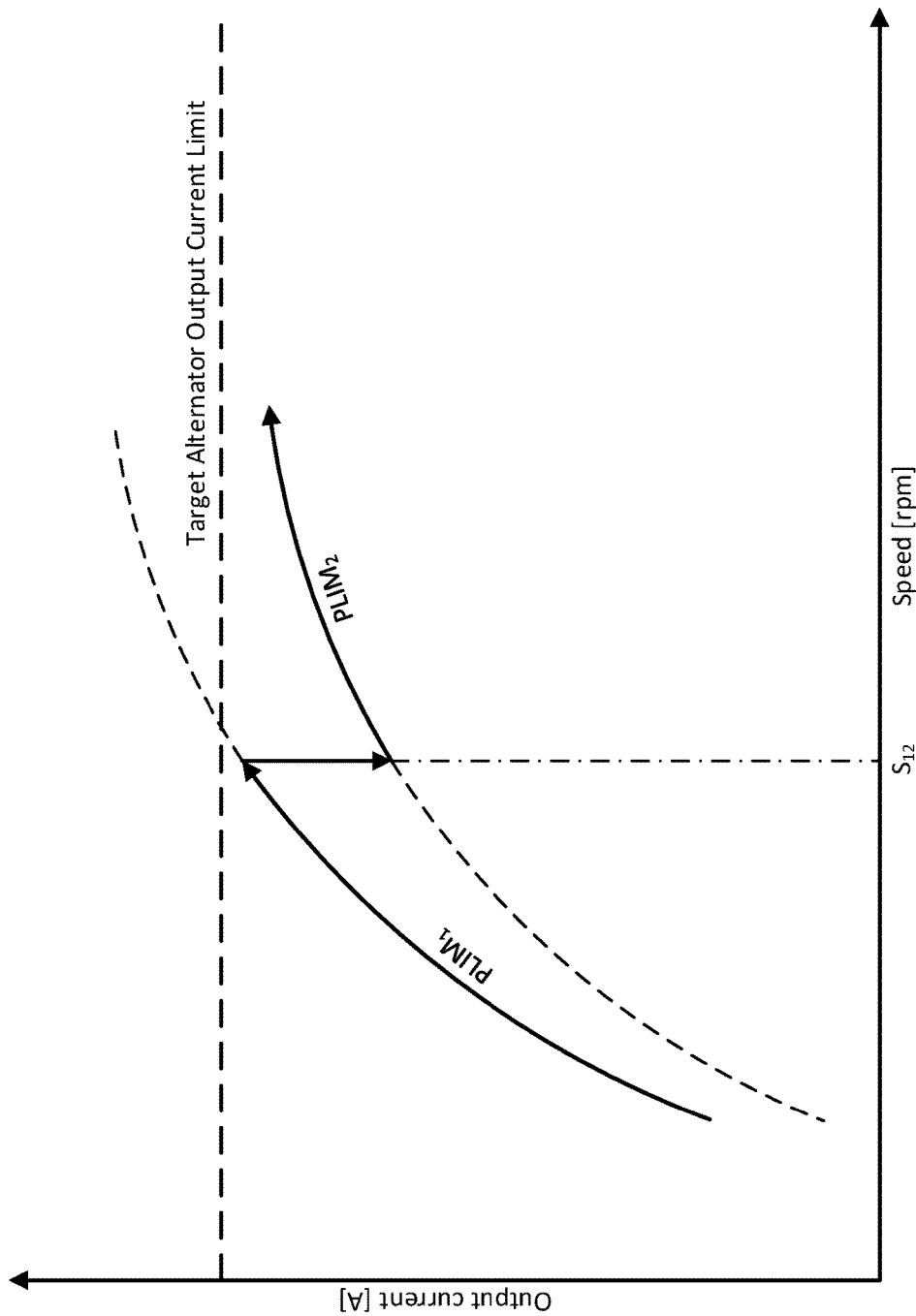
FIG. 6 illustrates output current curves.

FIG. 6 illustrates output current curves when one of several permanent output limits are applied to the alternator. As shown, a first permanent limit $PLIM_1$ is applied for speeds less than an engine speed threshold $s_{12}$. A second permanent limit ($PLIM_2$) is applied for speeds greater than the engine speed threshold $s_{12}$. Accordingly, the output current approaches the target maximum current output when the first (higher) permanent limit is applied. Before the output current exceeds the maximum current output, the second (lower) permanent limit is applied such that the output current is reduced. Accordingly, the output current of the alternator may not exceed the maximum current output, avoiding damage to the alternator.

Figure 7A:
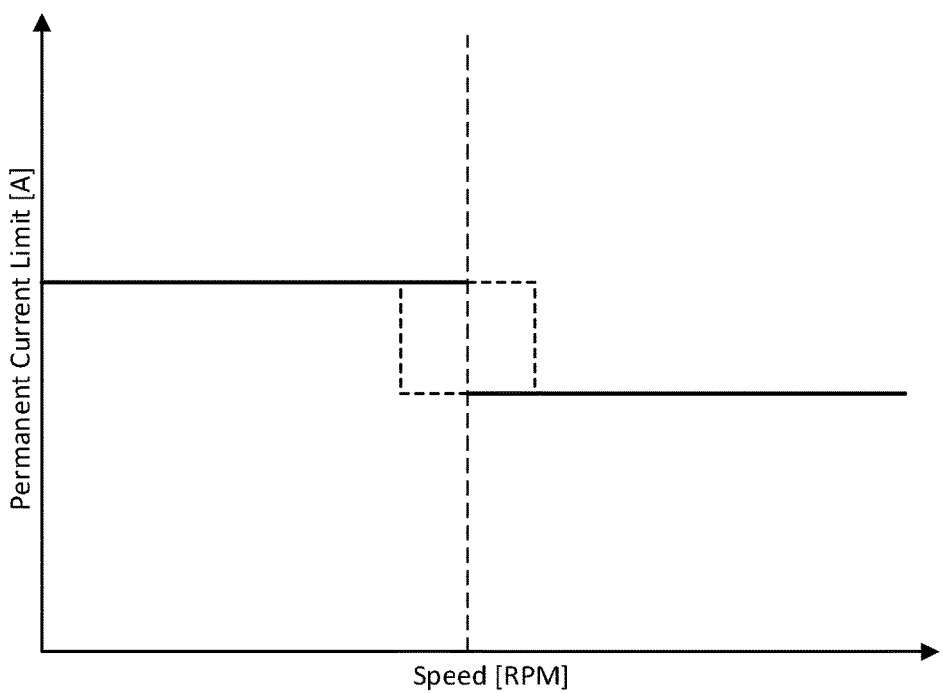
FIGS. 7A and 7B illustrate permanent limits for protecting an alternator.
Figure 7B:
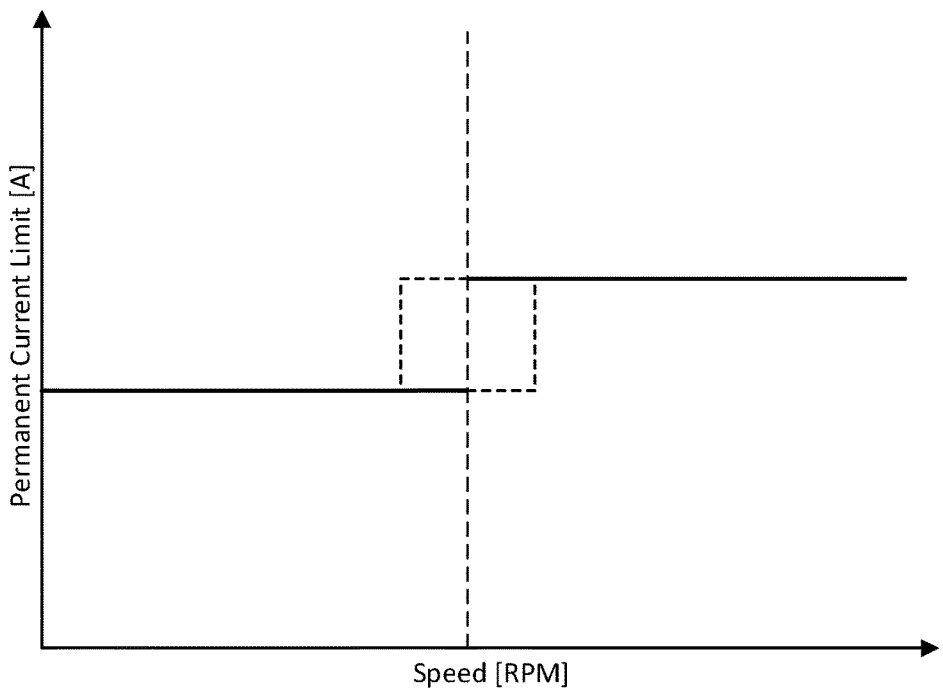

FIGS. 7A and 7B illustrate permanent limits for protecting an alternator from excessive current output and excessive counter-torque, respectively. FIG. 7A illustrates the application of two permanent limits, where a lower permanent limit is applied at higher engine speeds. Accordingly, FIG. 7A illustrates excitation currents for a power controller operating in an over-current protection mode.

FIG. 7B illustrates the application of two permanent limits, where a higher permanent limit is applied at higher engine speeds. Accordingly, FIG. 7B illustrates excitation currents for a power controller operating in an over-torque protection mode. As illustrated by the dotted lines, a hysteresis may be applied in both current-limiting and torque-limiting operating modes.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A device comprising:
   a digital interface configured to be coupled to an engine control unit (ECU);
   a regulator configured to be coupled to an excitation current input of an alternator, the excitation current controlling current generated by the alternator;
   a frequency sensor configured to measure a rotation speed of the alternator; and
   a memory configured to store a communicated limit received by the digital interface and a first permanent limit, the regulator configured to limit the excitation current to the lesser of the first permanent limit and the communicated limit.

2. The device of claim 1, wherein the regulator is further configured to periodically update the communicated limit with a value received from the ECU.

3. The device of claim 2, wherein the value received from the ECU is selected to limit the current generated by the alternator.

4. The device of claim 2, wherein the value received from the ECU is selected to limit counter-torque induced in the alternator.

5. The device of claim 1, wherein the memory is further configured to store a second permanent limit, and a rotation threshold associated with the second permanent limit, wherein the regulator is further configured to limit the excitation current to the lesser of the second permanent limit and the communicated limit when the rotation speed of the alternator is greater than the rotation threshold.

6. The device of claim 5, wherein the first permanent limit is greater than the second permanent limit.

7. The device of claim 5, wherein the first permanent limit is less than the second permanent limit.

8. The device of claim 1, wherein the regulator is further configured to limit the excitation current to the first permanent limit in response to the digital interface losing connection with the ECU.

9. The device of claim 1, further comprising the alternator.

10. The device of claim 9, wherein the alternator comprises a rotating coil in stator coils.

11. A method comprising:
    receiving a communicated limit for an excitation current in an alternator over a digital interface;
    determining a permanent limit for the excitation current in the alternator;
    limiting the excitation current to the communicated limit in response to the communicated limit being less than the permanent limit; and
    limiting the excitation current to the permanent limit in response to the communicated limit being greater than the permanent limit.

12. The method of claim 11, wherein determining the permanent limit comprises:
    determining a rotation speed of the alternator; and
    selecting a permanent limit from one or more permanent limits, the one or more permanent limits each corresponding to a lower and upper rotation speed threshold, the rotation speed of the alternator being between the lower and upper rotation speed threshold of the selected permanent limit.

13. The method of claim 12, wherein the one or more permanent limits comprise a first permanent limit and a second permanent limit, the upper rotation speed threshold of the first permanent limit being less than the upper rotation speed threshold of the second permanent limit.

14. The method of claim 13, wherein the first permanent limit is greater than the second permanent limit.

15. The method of claim 13, wherein the first permanent limit is less than the second permanent limit.

16. The method of claim 11, further comprising:
    receiving an updated permanent limit over the digital interface; and
    storing the updated permanent limit in memory.

17. A system comprising:
    an engine control unit (ECU);
    a digital interface coupled to the engine control unit;
    an alternator coupled to the digital interface, the alternator comprising:
       a memory configured to store a communicated limit received from the digital interface and a first permanent limit;
       an excitation current input; and a regulator coupled to the excitation current input, the regulator configured to control current output from the alternator by varying the excitation current, the regulator configured to limit the excitation current to the lesser of the first permanent limit and the communicated limit.

18. The system of claim 17, wherein the alternator further comprises a rotation sensor coupled to an output of the alternator, the rotation sensor configured to measure a rotation speed of the alternator.

19. The system of claim 18, wherein the memory is further configured to store a second permanent limit, the first permanent limit associated with a first rotation threshold and the second permanent limit associated with a second rotation threshold, the alternator configured to limit the excitation current to the first permanent limit when the rotation speed of the alternator is less than the first rotation threshold, the alternator configured to limit the excitation current to the second permanent limit when the rotation speed of the alternator is less than the second rotation threshold.

20. The system of claim 17, wherein the alternator is configured to update the first permanent limit stored in the memory with an updated permanent limit received from the ECU over the digital interface.

* * * * *